W. P. ORTH.
BORING MACHINE.
APPLICATION FILED MAY 5, 1911.
1,044,564.
Patented Nov. 19, 1912.
3 SHEETS—SHEET 2.
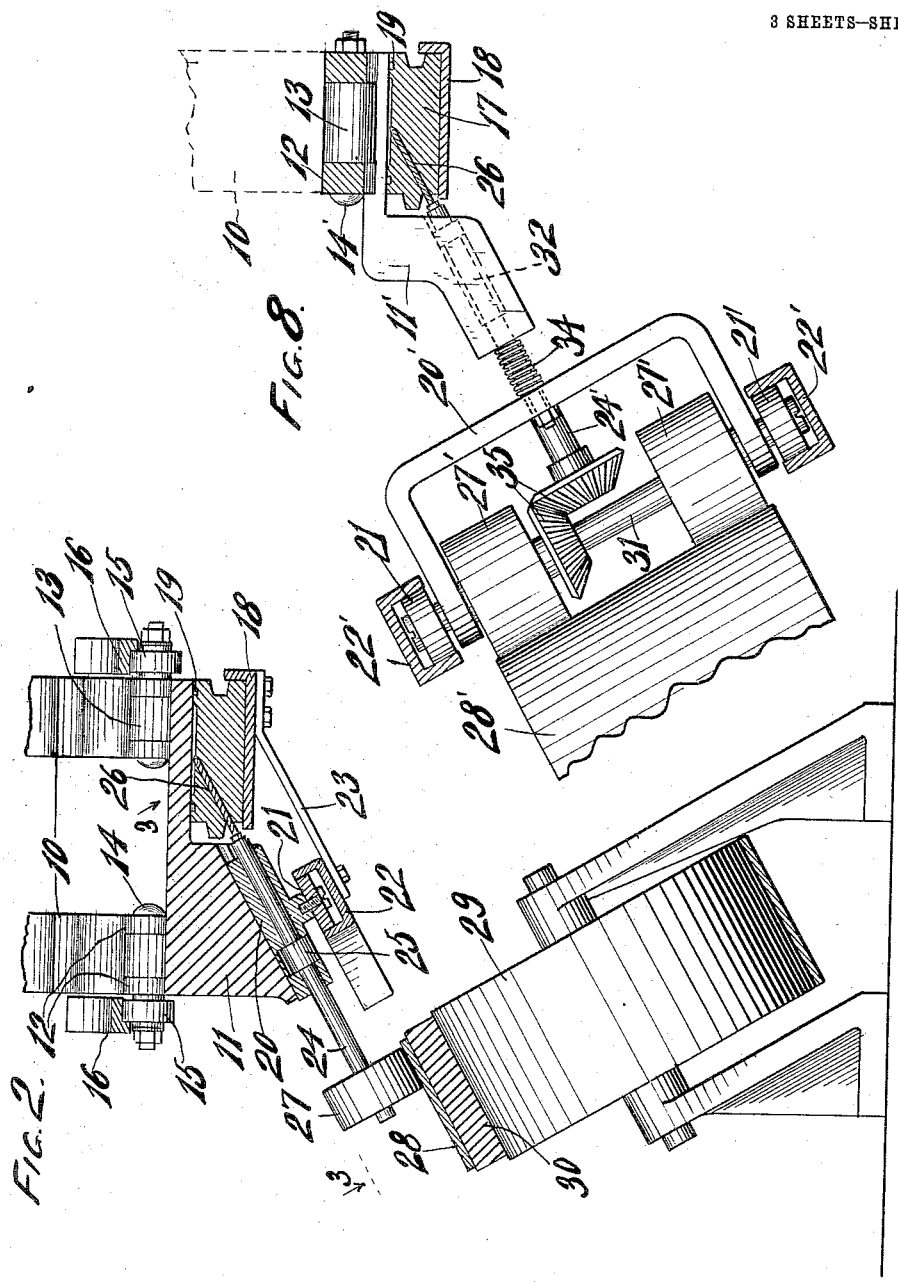

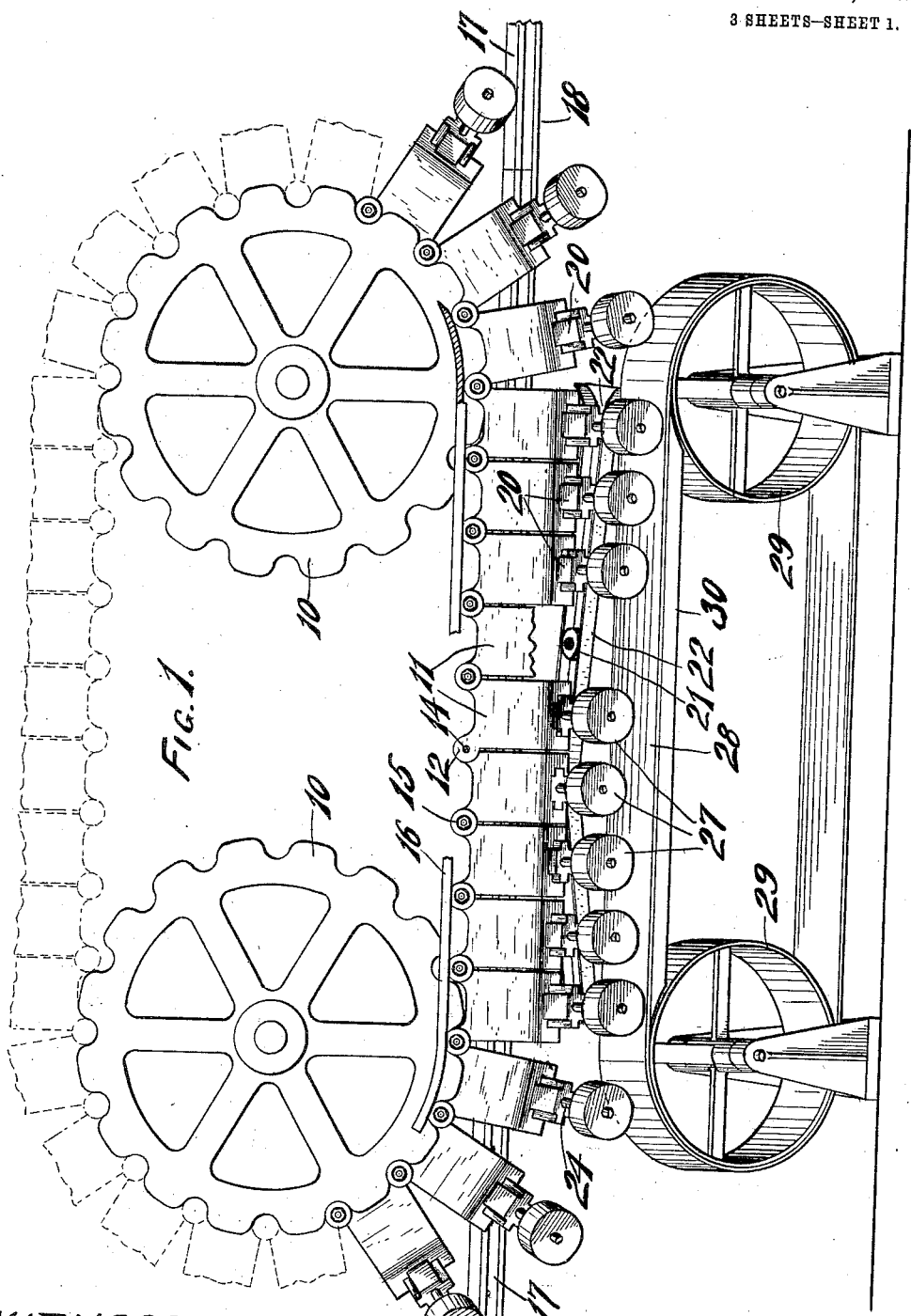

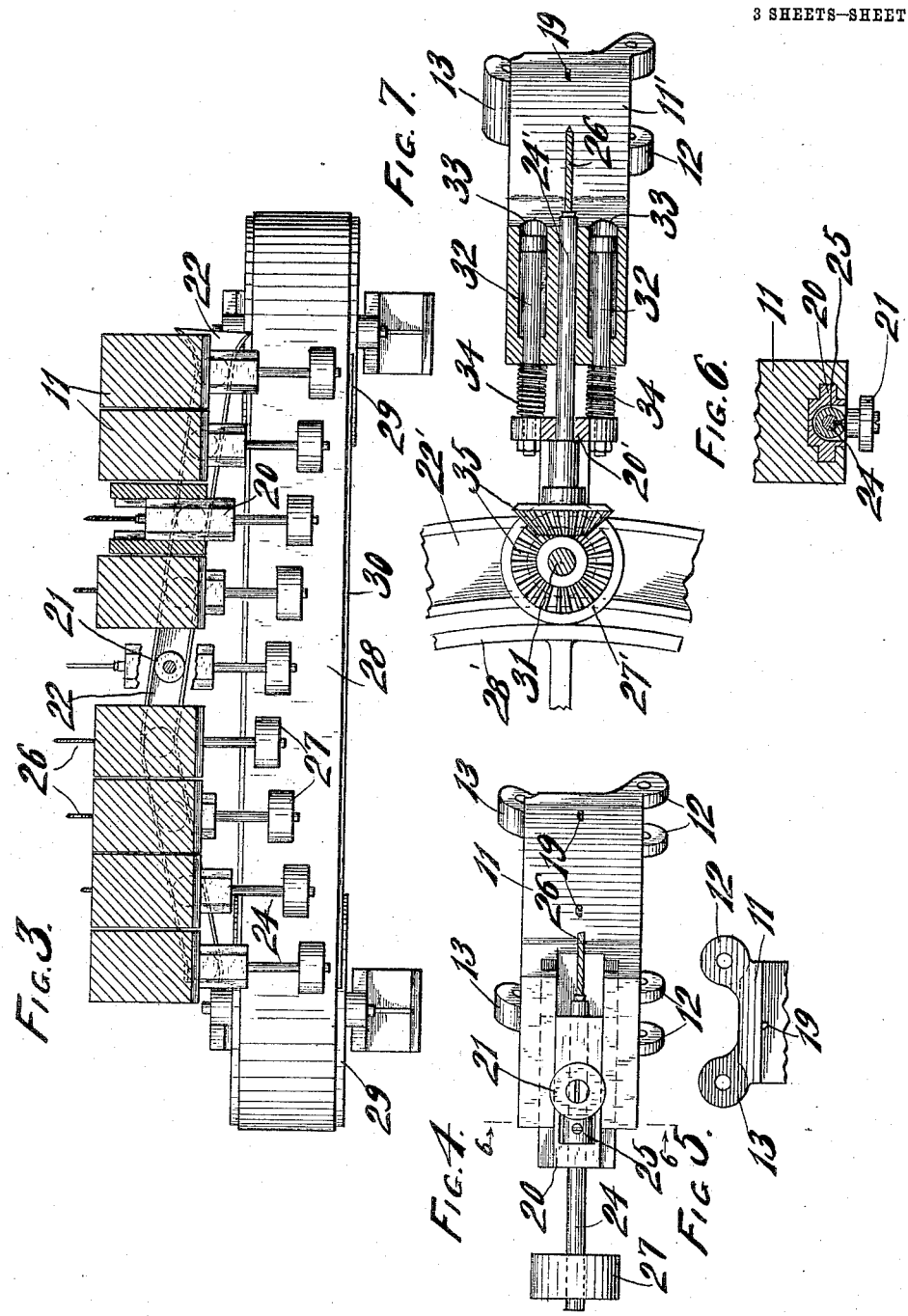

UNITED STATES PATENT OFFICE.

WILLIAM P. ORTH, OF MILWAUKEE, WISCONSIN.

BORING-MACHINE.

1,044,564.  Specification of Letters Patent.  Patented Nov. 19, 1912.

Application filed May 5, 1911. Serial No. 625,211.

*To all whom it may concern:*

Be it known that I, WILLIAM P. ORTH, a citizen of the United States, residing in Milwaukee, in the county of Milwaukee and State of Wisconsin, have invented new and useful Improvements in Boring-Machines, of which the following is a description, reference being had to the accompanying drawings, which are a part of this specification.

This invention has for its object to provide a boring machine particularly adapted for boring holes in the edges of strips of hardwood flooring or the like to receive the securing nails and avoid the increased labor and danger of splitting the flooring incident to the driving of nails through hard wood when such openings are not provided.

Another object of this invention is to provide such a boring machine capable of boring openings close together, desirably two inches apart, which will insure the presence of an opening in position to receive a nail that will enter a joist wherever the same is crossed by the flooring, such joists being usually two inches or more in thickness.

Another object of this invention is to provide a boring machine which will operate continuously without interrupting the feed of the material therethrough, the drills traveling in a straight line with the material for a sufficient distance to enable them to perform their work thereon and then being returned to the position of their initial engagement with the work.

Another object of this invention is to perfect details of construction of such boring machine.

With the above and other objects in view the invention consists in the boring machine as herein claimed, its parts and combinations of parts and all equivalents.

Referring to the accompanying drawings in which like characters of reference indicate the same parts in the different views: Figure 1 is a front elevation of a boring machine constructed in accordance with this invention; Fig. 2 is a transverse sectional view thereof; Fig. 3 is a sectional plan view thereof on the plane of line 3—3 of Fig. 2 looking in the direction of the arrows with parts broken away to show the construction and operation of the drill operating and advancing and withdrawing mechanism; Fig. 4 is a detail view of one of the drill carriers; Fig. 5 is a view showing the coupling connections thereof; Fig. 6 is a sectional view on the plane of line 6—6 of Fig. 4; Fig. 7 is a sectional view showing a modification of the invention; and, Fig. 8 is a detail end elevation thereof.

In these drawings the operative parts of the machine are illustrated in their relative positions without attempting to show the framework or supporting structure which may be of any desirable construction suitable for the purpose.

The machine as illustrated, comprises drill carriers pivotally connected together to form a chainlike structure traveling around sprocket wheels 10 and each consisting of an angular frame 11 with connecting means as pairs of ears 12 at one edge and lugs 13 at the other edge which fit with the complementary parts of adjacent frames and have pivot bolts 14 pass through them to constitute the knuckles or hinge connections for the chain. The said knuckles stand out from the drill carriers 11 and in traveling around the sprocket wheels 10 they fit within the notches thereof, there preferably being two of the sprocket wheels arranged side by side, as shown in Fig. 2, at each end of the course of the chain. The outer ends of the pivot bolts 14 have guide rollers 15 mounted thereon which ride in flanged guide tracks 16 during the travel of the drill carriers from one of the sprocket wheels 10 to the other. Each of the frames 11 has a flat portion at one side and these parts of the several drill carriers form a horizontal bearing to engage the top surface of strips of flooring 17 which are supported by a stationary flanged work support 18. This flat surface of each link 11 has spurs 19 projecting from it to enter the strips of flooring and force them to move along with the chain so that the work is positively fed forward by means of the chain. Each drill carrier is also provided with an inclined grooved guideway in which a drill holder 20 is slidably mounted, said drill holder preferably comprising a flanged slide freely working in the guideway and carrying a roller 21, which, during the portion of the travel through which the drill is to be operative, rides within a fixed cam guide channel 22 that may be connected by strips 23 or otherwise with the stationary work support 18.

The entrance end of the guide channel 22 is preferably flaring, as shown in Fig. 3, to insure the proper engagement of the rollers 21 therein. This engagement of the rollers 21 with the guide channel 22 causes the drill holders 20 to slide in their guideways toward and away from the work. Drill spindles 24 pass through the drill holders 20 and while being free to turn therein are prevented from longitudinal movement independent of the drill holders by having collars 25 fixed thereon and contained within recesses of the drill holders as clearly shown in Figs. 2, 4 and 6. At their inner ends the drill spindles 24 are provided with drill chucks to receive drill points 26 while at their outer ends they are provided with friction rollers 27 which engage an inclined driving belt 28 carried by inclined pulleys 29 which are driven by any suitable means, not shown, said driving belt being prevented from sagging between the pulleys 29 by a stationary belt support 30 therebeneath.

In operation strips of flooring or the like are fed to the machine on the work support 18 with the smooth face thereof downward and the grooved edge in engagement with the flange of said work support, and the spurs 19 of the drill carriers on coming into engagement therewith will cause said strips to be forcibly driven along with the chain. The roller 27 of each drill carrier, on coming into engagement with the driving belt 28, is caused to turn thereby and thus rotate the drill, while the engagement of the roller 21 in the guide channel 22 causes the drill holder to slide toward the work and feed the drill therethrough, the positioning of the parts being such that the drill enters at the base of the tongue of the strip and preferably completes its passage through the strip at an angle which will be suitable for the securing nail of the flooring. The drill may be provided with a head for counter-sinking the opening produced thereby so as to accommodate the head of the securing nail. After the drill has performed its work, it is retracted by the travel of the roller 21 in the portion of the guide channel which recedes from the work and during the inward and outward movement of the drill, its driving connection is maintained by the travel of the driving roller 27 across the face of the driving belt 28, the latter being sufficiently broad for that purpose.

While a partitcular construction has been shown and described in order to explain the theory of this invention, it is to be understood that the invention is not limited to any particular construction, nor is it limited to the particular purpose specified, for the idea is equally applicable for boring for any purpose, and whether the opening is to be inclined or not.

A construction exemplifying another exemplification of the invention is shown in Figs. 7 and 8, wherein the driving belt is replaced by a driving wheel 28' and the drill holder 20' is in the form of a yoke carrying a shaft 31 in its arms with a pair of rollers 21' thereon traveling in guide channels 22', said shaft being provided with a pair of friction rollers 27' to engage the surface of the driving wheel 28' and receive motion therefrom. The frame 20' is slidably mounted on the drill carrier 11' by having a pair of headed guide rods 32 fixed thereon and slidable within openings 33 of said drill carrier, coil springs 34 surrounding the guide rods 32 to press the drill holder 20' away from the work. The drill spindle 24' has a bearing in the drill holder 20' and slidably passes through the drill carrier 11, receiving its motion from the shaft 31 by means of a pair of intermeshing beveled gears 35. With this construction the curvature of the drive wheel 28' may be relied upon to produce movement of the drill holder 20' toward the work while at the same time the surface engagement of said driving wheel with the rollers 27' serves to drive the drill to produce the cutting operation, though the channel guides 22' may be provided to assist in guiding the drill holder in its movements to feed the drill through the work.

By means of this invention the flooring may be bored with the openings as close together as desired to assure the presence of a nail hole at each joist or timber to which it is to be secured, the distance between them determining the length of the links of the chain. The chain serves as a conveyer for feeding the material through the machine continuously and during its passage through the machine it is operated upon by drills which automatically start into operation upon coming into the proper relation with the work by the engagement of their rollers 27 with the driving belt 28. The drills travel with the work and are forced into it by the influence of the cam guide 22 and when the nail holes have been bored, the drills are withdrawn by the same means and the drill carriers returned to their starting position.

Another feature of advantage of the present invention is that the nail openings are drilled entirely through the flooring and hence the liability of splitting the flooring when driving nails through it is reduced to a minimum. The operation is continuous and because of the right line movement of the drill carriers, while the drills are being forced into and out of the work, the drills are not liable to be broken off, even though they pass entirely through the work.

What I claim as new and desire to secure by Letters Patent is:

1. A boring machine, comprising a work guide on which work may travel through the machine, traveling drill carriers pivotally connected together in an endless chain and movable in the direction of movement of the work, suitably operated drills mounted on the drill carriers, and means for moving the drills toward and away from the work.

2. A boring machine, comprising a work guide on which work may travel through the machine, a series of drill carriers pivotally connected together to form an endless chain with one portion moving in the direction of movement of the work, drills mounted on the drill carriers, and means for moving the drills toward and away from the work during its travel in the direction of travel of the work.

3. A boring machine, comprising a work guide on which work may travel through the machine, a series of drill carriers pivotally connected together to form an endless chain, guide rollers at the pivotal connections of the drill carriers, a guide track in position to have the rollers ride thereon during a portion of the travel of the chain to guide the drill carriers in their travel in the direction of movement of the work through the machine, suitably driven drills mounted on the drill carriers, and means for moving the drills into the work and for withdrawing them therefrom.

4. A boring machine, comprising a work guide on which work may travel through the machine, drill carriers pivotally connected together to form a chain with one portion thereof traveling in the direction of travel of the work through the machine, projections on the drill carriers for engaging the work whereby the work and the drill carriers move together, drills carried by the drill carriers, and means for moving the drills toward and away from the work.

5. A boring machine, comprising a work guide on which work may travel through the machine on its face, drill carriers pivotally connected together to form a chain with one portion thereof traveling in the direction of travel of the work through the machine, each of said drill carriers having a flat bearing surface to bear upon the side of the work which is opposite its face so that the work is held between the drill carriers and the work guide, drills carried by the drill carriers in an inclined position with relation to the flat bearing surface of the drill carriers, and means for moving the drills toward and away from the work whereby oblique openings are drilled at intervals through the work from one edge thereof to the side which is opposite the face thereof.

6. A boring machine, comprising a work guide on which work may travel through the machine, a series of drill carriers pivotally connected together to form a chain with one portion thereof moving in the direction of movement of the work, drills mounted on the drill carriers and capable of moving endwise thereon, projections carried by the drills, a cam in the path of the projections for moving the drills endwise into engagement with the work, and means for turning the drills during their longitudinal movements.

7. A boring machine, comprising a work guide on which work may travel through the machine, a series of drill carriers pivotally connected together to form a chain with one portion moving in the direction of movement of the work, drill holders slidably mounted in the drill carriers, drills carried by the drill holders, rollers on the drill holders, a cam in the path of the rollers for causing the drill holders to move toward and away from the work and thus feed the drills through the work, and means for turning the drills during the movements of the drill holders.

8. A boring machine, comprising a work guide on which work may travel through the machine, a series of drill carriers pivotally connected together to form a chain with one portion moving in the direction of movement of the work, drills carried by the drill carriers, means for moving the drills toward and away from the work during their travel with the work, rollers on the drills, and a driving means engaged by the rollers for turning the drills during their movements toward the work.

9. A boring machine, comprising a work guide on which work may travel through the machine, a series of drill carriers pivotally connected together to form a chain with one portion moving in the direction of movement of the work, drills carried by the drill carriers, means for moving the drills toward and away from the work during their travel with the work, rollers on the drills, and a driving belt engaged by the rollers for turning the drills during their movements toward the work.

10. A boring machine, comprising a work guide on which work may travel through the machine, a series of drill carriers pivotally connected together to form a chain with one portion moving in the direction of movement of the work, drills mounted to have a longitudinal movement in the drill carriers, and means for giving the drills a longitudinal movement and a rotary movement during their travel with the work.

In testimony whereof, I affix my signature, in presence of two witnesses.

WILLIAM P. ORTH.

Witnesses:
R. S. C. CALDWELL,
KATHERINE HOLT.